United States Patent
Egami

[11] Patent Number: 5,359,507
[45] Date of Patent: Oct. 25, 1994

[54] SEQUENCE CONTROLLER

[75] Inventor: Noritaka Egami, Nagasaki, Japan

[73] Assignee: Mitsubishi Denki Kabushiki Kaisha, Tokyo, Japan

[21] Appl. No.: 34,220

[22] Filed: Mar. 12, 1993

Related U.S. Application Data

[63] Continuation of Ser. No. 476,608, Feb. 7, 1990, abandoned.

[30] Foreign Application Priority Data

Apr. 7, 1989 [JP] Japan ................. 1-86952
Apr. 7, 1989 [JP] Japan ................. 1-86953

[51] Int. Cl.$^5$ ............................................. G06F 15/46
[52] U.S. Cl. ........................... 364/140; 364/141; 364/191
[58] Field of Search ............... 364/140–143, 364/900, 130–133, 144–147, 191–193

[56] References Cited

U.S. PATENT DOCUMENTS

| | | | |
|---|---|---|---|
| 4,575,816 | 3/1986 | Hendrickson et al. | 364/900 |
| 4,603,379 | 7/1986 | Strosser et al. | 364/130 |
| 4,609,984 | 9/1986 | Strosser et al. | 364/130 |
| 4,794,512 | 12/1988 | Toyama et al. | 364/140 |
| 4,825,352 | 4/1989 | Iijima et al. | 364/143 |
| 4,827,396 | 5/1989 | Taniguchi | 364/140 |
| 4,931,704 | 6/1990 | Ikeda et al. | 364/140 |
| 5,208,743 | 5/1993 | Nishikawa | 364/140 |

Primary Examiner—Jerry Smith
Assistant Examiner—Thomas E. Brown
Attorney, Agent, or Firm—Burns, Doane, Swecker & Mathis

[57] ABSTRACT

Disclosed herein is a sequence controller capable of executing programmable sequence operations written in its sequence table. The sequence table comprises a group of input condition collecting instructions, a group of branch condition collecting instructions, a table instruction and a group of input instructions, and has an accumulator for combining such instructions organically and selectively to deal with various sequence operation conditions. Thus it is possible to provide complicated control operations by use of the sequence table. The sequence table also contains a step number storing section which stores the original step number upon transition from one step to another, and a step return performing portion. When a predetermined branch condition is met, the step return performing portion initiates a return to the step stored in the section or to the step next thereto. Thus the error-handling steps are shared among different processes, and the total number of steps in the sequence table is reduced accordingly.

11 Claims, 11 Drawing Sheets

| | (EXECUTION INSTRUCTION) | STEP | ST1 | ST2 | ST3 | ST4 | ST5 | ST6 | ST7 | ST8 | ST9 |
|---|---|---|---|---|---|---|---|---|---|---|---|
| OUTPUT DATA | → O 4 | VALVE (A) | 0 | 1 | | 0 | | 0 | 0 | | 0 |
| | → O 5 | VALVE (B) | 0 | 0 | | 1 | | 0 | 0 | | 0 |
| | → O 6 | VALVE (DISCHARGE) | 0 | 0 | | 0 | | 0 | 1 | | 0 |
| | → O 7 | MOTOR | 0 | 0 | | 0 | | 1 | 0 | | 0 |
| | → O 15 ;K0,K1+EW0→EW0 | WARNING | 0 | 0 | 1 | 0 | 1 | 0 | 0 | 1 | 0 |
| INPUT DATA | ;I 10 OR I 11 | LEVEL (HIGH) | | 0 | | 1 | | 1 | 0 | | |
| | ;I 20 OR I 21 | LEVEL (MIDDLE) | | 1 | | 1 | | 1 | 0 | | |
| | ;I 30 OR I 31 | LEVEL (LOW) | | 1 | | 1 | | 1 | 0 | | |
| | I 8 | START | 1 | | | | | | | | |
| | I 9 | START AFTER FAULT | | 1 | | 1 | | 1 | | 1 | |
| BRANCH CONDITION | No.1 M 11 | NORMAL | ST2 | ST4 | ST2 | ST6 | ST4 | | ST9 | ST7 | ST1 |
| | No.2 M 12 | STEP TIMER | | | | | | ST7 | | | |
| | No.3 M 17 | ABNORMAL (MONITORING TIMER) | | ST3 | | ST5 | | | ST8 | | |

FIG. 1 (PRIOR ART)

| | | STEP No. | ST1 | ST2 | ST3 | ST4 | ST5 | ST6 | ST7 | ST8 | ST9 |
|---|---|---|---|---|---|---|---|---|---|---|---|
| | (ADDRESS PART) | | | | | | | | | | |
| OUTPUT DATA | O 4 | VALVE (A) | 0 | 1 | | 0 | | 0 | 0 | | 0 |
| | O 5 | VALVE (B) | 0 | 0 | | 1 | | 0 | 0 | | 0 |
| | O 6 | VALVE (DISCHARGE) | 0 | 0 | | 0 | | 0 | 1 | | 0 |
| | O 7 | MOTOR | 0 | 0 | | 0 | | 1 | 0 | 1 | 0 |
| | O 15 | WARNING LAMP | 0 | 0 | 1 | 0 | 1 | 0 | 0 | | 0 |
| INPUT DATA | I 10 | LEVEL (HIGH) | | 0 | | 1 | | 1 | 0 | | |
| | I 20 | LEVEL (MIDDLE) | | 1 | | 1 | | 1 | 0 | | |
| | I 30 | LEVEL (LOW) | | 1 | | 1 | | 1 | 0 | | |
| | I 8 | START | 1 | | | | | | | | |
| | I 9 | START AFTER FAULT | | | | | 1 | | | 1 | |
| BRANCH CONDITION | No.1 M11 | NORMAL | ST2 | ST4 | ST2 | ST6 | ST4 | | ST9 | ST7 | ST1 |
| | No.2 M12 | STEP TIMER | | | | | | ST7 | | | |
| | No.3 M17 | ABNORMAL (MONITORING TIMER) | | ST3 | | ST5 | | | ST8 | | |

FIG. 2
(PRIOR ART)

EXE - TBL-1

FIG. 3
(PRIOR ART)

| O 4 |
| O 5 |
| O 6 |
| O 7 |

| I 10 |
| I 20 |
| I 30 |
| I 8 |
| I 9 |

| M 11 |
| M 12 |
| M 17 |

| | (EXECUTION INSTRUCTION) | STEP | ST1 | ST2 | ST3 | ST4 | ST5 | ST6 | ST7 | ST8 | ST9 |
|---|---|---|---|---|---|---|---|---|---|---|---|
| OUTPUT DATA | →O4 | VALVE (A) | 0 | 1 | | 0 | | 0 | 0 | | 0 |
| | →O5 | VALVE (B) | 0 | 0 | | 1 | | 0 | 0 | | 0 |
| | →O6 | VALVE (DISCHARGE) | 0 | 0 | | 0 | | 0 | 1 | | 0 |
| | →O7 | MOTOR | 0 | 0 | | 0 | | 1 | 0 | 1 | 0 |
| | →O15 ;K0,K1+EW0→EW0 | WARNING | 0 | 0 | 1 | 0 | 1 | 0 | 0 | | 0 |
| INPUT DATA | ;I10 OR I111 | LEVEL (HIGH) | | 0 | | 1 | | 1 | 0 | | |
| | ;I20 OR I121 | LEVEL (MIDDLE) | | 1 | | 1 | | 1 | 0 | | |
| | ;I30 OR I131 | LEVEL (LOW) | | 1 | | 1 | | 1 | 0 | | |
| | I8 | START | 1 | | | | | | | | |
| | I9 | START AFTER FAULT | | | 1 | | 1 | | | 1 | |
| BRANCH CONDITION | No.1 M11 | NORMAL | ST2 | ST4 | ST2 | ST6 | ST4 | | ST9 | ST7 | ST1 |
| | No.2 M12 | STEP TIMER | | | | | | ST7 | | | |
| | No.3 M17 | ABNORMAL (MONITORING TIMER) | | ST3 | | ST5 | | | ST8 | | |

| | (ADDRESS PART) | STEP No. | ST1 | ST2 | ST3 | ST4 | ST5 | ST6 | ST7 | ST8 | ST9 |
|---|---|---|---|---|---|---|---|---|---|---|---|
| OUTPUT DATA | O 4 | VALVE (A) | 0 | | 1 | 0 | 0 | 0 | 0 | | |
| | O 5 | VALVE (B) | 0 | | 0 | 1 | 0 | 0 | 0 | | |
| | O 6 | VALVE (DISCHARGE) | 0 | | 0 | 0 | 0 | 1 | 0 | | |
| | O 7 | MOTOR | 0 | | 0 | 0 | 1 | 0 | 0 | | |
| | O 15 | WARNING LAMP | 0 | 1 | 0 | 0 | 0 | 0 | 0 | | |
| INPUT DATA | I 10 | LEVEL (HIGH) | | | 0 | 1 | 1 | 1 | | | |
| | I 20 | LEVEL (MIDDLE) | | | 1 | 1 | 1 | 0 | | | |
| | I 30 | LEVEL (LOW) | | | 1 | 1 | 1 | 0 | | | |
| | I 8 | START | 1 | | | | | | | | |
| | I 9 | START AFTER FAULT | | 1 | | | | | | | |
| BRANCH CONDITION | No.1 M11 | NORMAL | ST3 | STR | ST4 | ST5 | | ST7 | ST1 | | |
| | No.2 M12 | STEP TIMER | | | | | ST6 | | | | |
| | No.3 M17 | ABNORMAL (MONITORING TIMER) | | | 2S | 2S | | 2S | | | |

FIG. 14

| | (ADDRESS PART) | STEP No. | ST1 | ST2 | ST3 | ST4 | ST5 | ST6 | ST7 | ST8 | ST9 |
|---|---|---|---|---|---|---|---|---|---|---|---|
| OUTPUT DATA | O 4 | VALVE (A) | 0 | | 1 | 0 | 0 | 0 | 0 | | |
| | O 5 | VALVE (B) | 0 | | 0 | 1 | 0 | 0 | 0 | | |
| | O 6 | VALVE (DISCHARGE) | 0 | | 0 | 0 | 0 | 0 | 0 | | |
| | O 7 | MOTOR | 0 | | 0 | 0 | 1 | 1 | 1 | | |
| | O 15 | WARNING LAMP | 0 | 1 | 0 | 0 | 0 | 0 | 0 | | |
| INPUT DATA | I 10 | LEVEL (HIGH) | | | 0 | 1 | 0 | 1 | | | |
| | I 20 | LEVEL (MIDDLE) | | | 1 | 1 | 1 | 0 | | | |
| | I 30 | LEVEL (LOW) | | | 1 | 1 | 1 | 0 | | | |
| | I 8 | START | 1 | | | | | | | | |
| | I 9 | START AFTER FAULT | | 1 | | | | | | | |

| | | | NORMAL | STR | ST3 | ST4 | ST5 | | ST7 | ST1 | |
| | No.1 | M11 | STEP TIMER | | | | | ST6 | | | |
| BRANCH CONDITION | No.2 | M12 | | | | ST2 | | | | | |
| | No.3 | M17 S | ABNORMAL(MONITORING TIMER) | | ST2 | ST2 | | | ST2 | | |

FIG. 15

| | | STEP No.<br>(ADDRESS PART) | ST1 | ST2 | ST3 | ST4 | ST5 | ST6 | ST7 | ST8 | ST9 |
|---|---|---|---|---|---|---|---|---|---|---|---|
| OUTPUT DATA | O 4 | VALVE (A) | 0 | | 1 | 0 | 0 | 0 | 0 | | |
| | O 5 | VALVE (B) | 0 | | 0 | 1 | 0 | 0 | 0 | | |
| | O 6 | VALVE (DISCHARGE) | 0 | | 0 | 0 | 0 | 1 | 0 | | |
| | O 7 | MOTOR | 0 | | 0 | 0 | 1 | 0 | 1 | | |
| | O 15 | WARNING LAMP | 0 | 1 | 0 | 0 | 0 | 0 | 0 | | |
| INPUT DATA | I 10 | LEVEL (HIGH) | | | 0 | 1 | 0 | 1 | | | |
| | I 20 | LEVEL (MIDDLE) | | | 1 | 1 | 1 | 0 | | | |
| | I 30 | LEVEL (LOW) | | | 1 | 1 | 1 | 0 | | | |
| BRANCH CONDITION | No.1 | M 11 | NORMAL | | ST4 | ST5 | ST6 | ST7 | ST1 | | |
| | No.2 | M 12 | STEP TIMER | | | | ST6 | | | | |
| | No.3 | M 17 | ABNORMAL (MONITORING TIMER) | | | 2S | 2S | | 2S | | | |
| | I 8 | START | ST3 | | | | | | | | |
| | I 9 | START AFTER FAULT 1 | | R1 | | | | | | | |
| | I 14 | START AFTER FAULT 2 | | R2 | | | | | | | |

SEQUENCE CONTROLLER

This application is a continuation of application Ser. No. 07/476,608 filed Feb. 7, 1990, now abandoned.

BACKGROUND OF THE INVENTION

1. Field of the Invention

The present invention relates to a sequence controller capable of programmable sequence control operations.

2. Description of the Prior Art

FIGS. 1 through 4 show a typical sequence table and a representative sequence control method utilized by prior art sequence controllers of this kind. FIGS. 5 through 8 are views illustrating how a conventional sequence controller operates. FIG. 5 shows a system block diagram of the sequence controller that controls a two-liquid mixer. In this figure, numeral 1 designates a sequence controller, 2 a tank in which to mix liquids A and B, 3 a mixer that mixes the two liquids, 4 a valve for the liquid A, 5 a valve for the liquid B, 6 a valve for discharging the liquid mixture, 7 a motor that turns the mixer 3, 8 a start push-button switch, 9 a push-button switch for resetting an emergency stop, and 10, 20 and 30 level switches for detecting the liquid level in the tank 2. The valve 4 is opened at a logical "1" and closed at "0" under control of an output 04 of the sequence controller 1. The valves 5 and 6 are operated likewise as described above under control of outputs 05 and 06, respectively. The motor 7, under control of an output 07, is started at a logical "1" and stopped at "0". The start push-button switch 8 and the emergency stop reset push-button switch 9 are connected to I8 and I9, respectively, both being inputs of the sequence controller 1. These switches are each turned on at a logical "1" and off at "0". The level switches 10, 20 and 30 are connected to inputs I10, I20 and I30, respectively. A liquid level exceeding any of these three switches causes a logical "1" to be set; when the switches remain above the level, a logical "0" is maintained. In FIG. 5, numeral 15 designates a warning lamp. Connected to an output 015, the lamp 15 is turned on at a logical "1" and off at "0".

Figure 1:
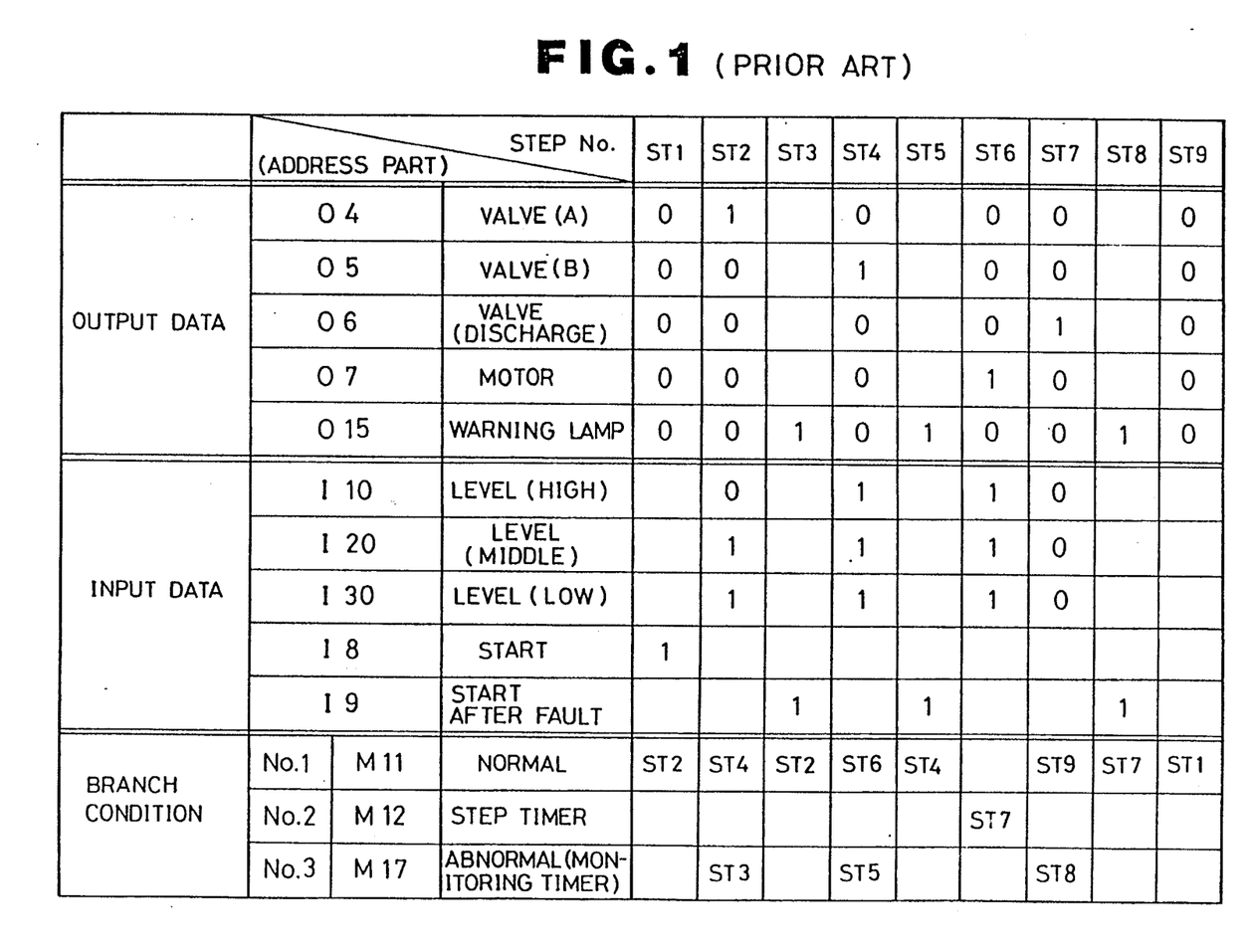
FIG. 1 is a sequence table for use by prior art sequence controllers.

FIG. 1 shows a sequence table describing the operating procedure for controlling the system shown in FIG. 5. More specifically, the sequence table of FIG. 1 is made up of three tables: a variable data table of FIG. 7, a detailed data table of FIG. 6, and a fixed data table of FIG. 3. The sequence is effected in accordance with a flowchart of FIG. 4 by periodically executing a table execution instruction "EXE-TBL-1" of FIG. 2. The sequence controller 1 is capable of executing such multiple tables in a row. Here, the description will be limited to the table 1 to avoid explanatory duplication.

Figure 4:
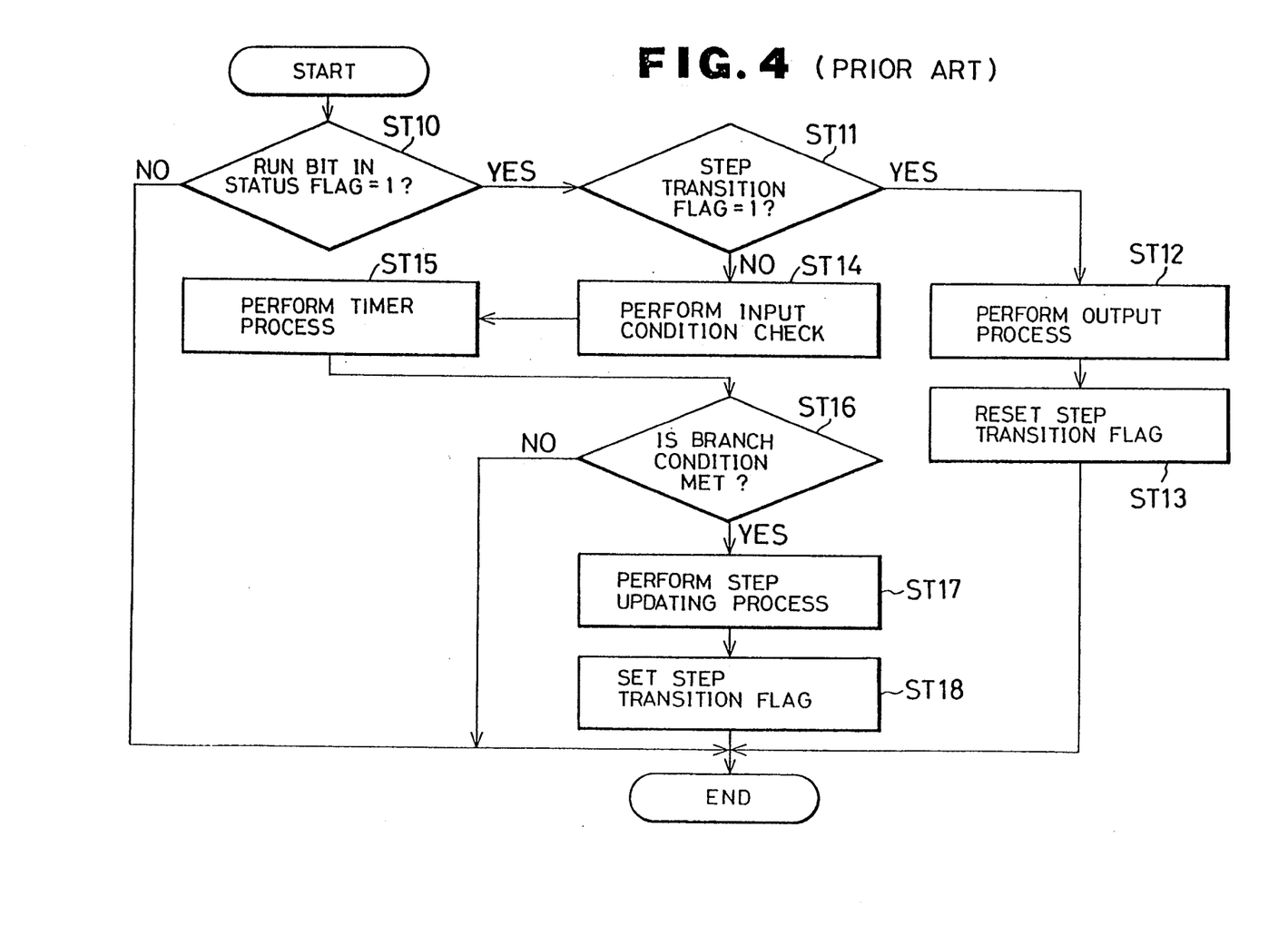
FIG. 4 is a table execution flowchart that applies to prior art sequence controllers.
Figure 5:
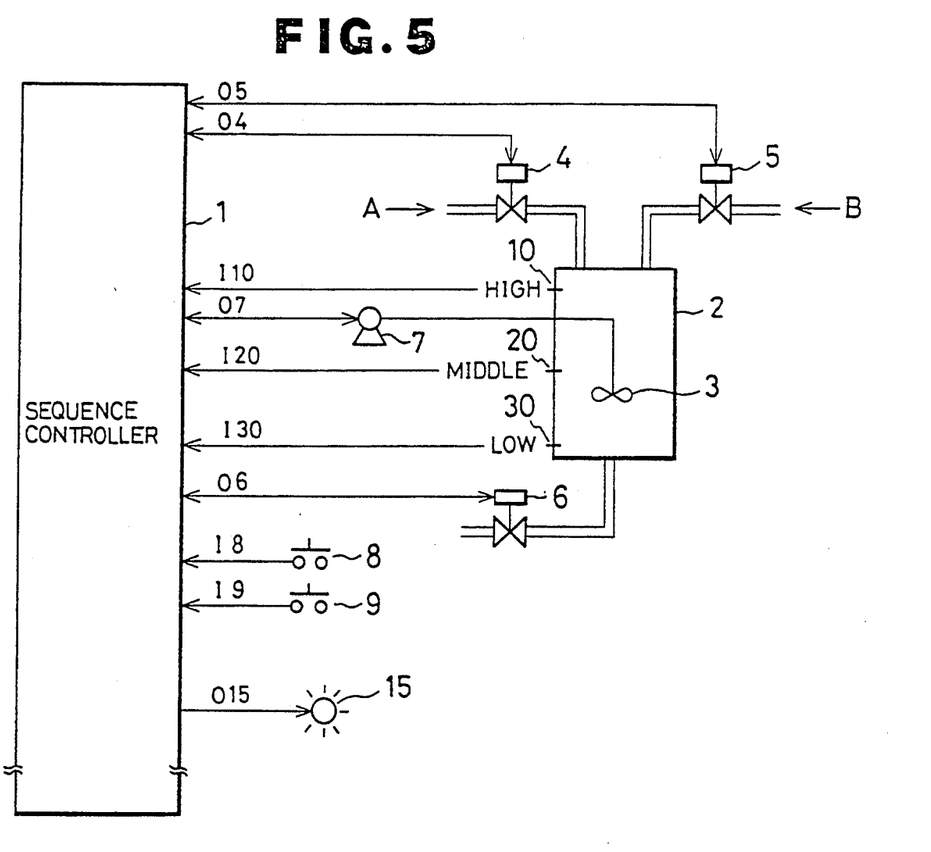
FIG. 5 is a system block diagram which comprises a conventional sequence controller.

FIG. 4 shows a flowchart outlining what the table execution instruction does.

There will now be described how the sequence controller shown in FIG. 5 works by referring to the sequence table of FIG. 1. In step ST1 of the sequence table, activation of the start push-button switch (i.e., input I8 going "1") is awaited. When the switch 8 is turned on, M11 (normal) is set to a logical "1" and step ST2 is reached. In step ST2, the output 04 is effected (i.e., only the valve 4 for liquid A is at a logical "1"; all other outputs are at a logical "0" each). The liquid A is injected into the tank 2. When the liquid level goes up to about the middle mark through liquid injection (i.e., when inputs I20 and I30 are at a logical "1" each), M11 (normal) is set to a logical "1" and step ST4 is reached. (Steps ST3, ST5 and ST8 are for error processing each.) In step ST4, the output 05 is effected (i.e., only the valve 5 for liquid B is opened at a logical "1"; all other outputs are at a logical "0" each). The liquid B is injected into the tank 2. When the liquid level goes up to the high mark (i.e., when the inputs I10, I20 and I30 are at a logical "1" each), M11 (normal) is set to a logical "1" and step ST6 is reached. In step ST6, the output 07 of the motor 7 is turned on to mix the liquids. In step ST7, the output 06 of the mixture discharging valve 6 is opened to have the tank 2 empty its contents. In step ST9, every output is set to a logical "0" and then step ST1 is reached again. This is how the normal sequence takes place.

Figure 2:
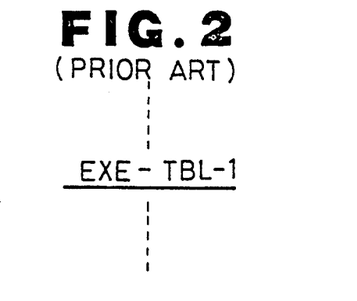
FIG. 2 is a table execution instruction diagram for use by prior art sequence controllers.

The sequence table is also operated by periodically executing the table execution instruction "EXE-TBL-1" of FIG. 2. The flowchart applicable to that kind of execution is shown in FIG. 4. (The operations in FIG. 4 will be described later.)

Figure 3:
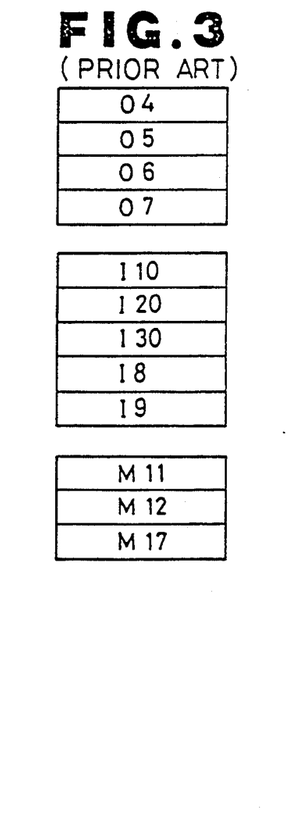
FIG. 3 is a fixed data table for use by prior art sequence controllers.

FIG. 3 shows a fixed data table that stores the address parts of the sequence table in FIG. 1.

Figure 6:
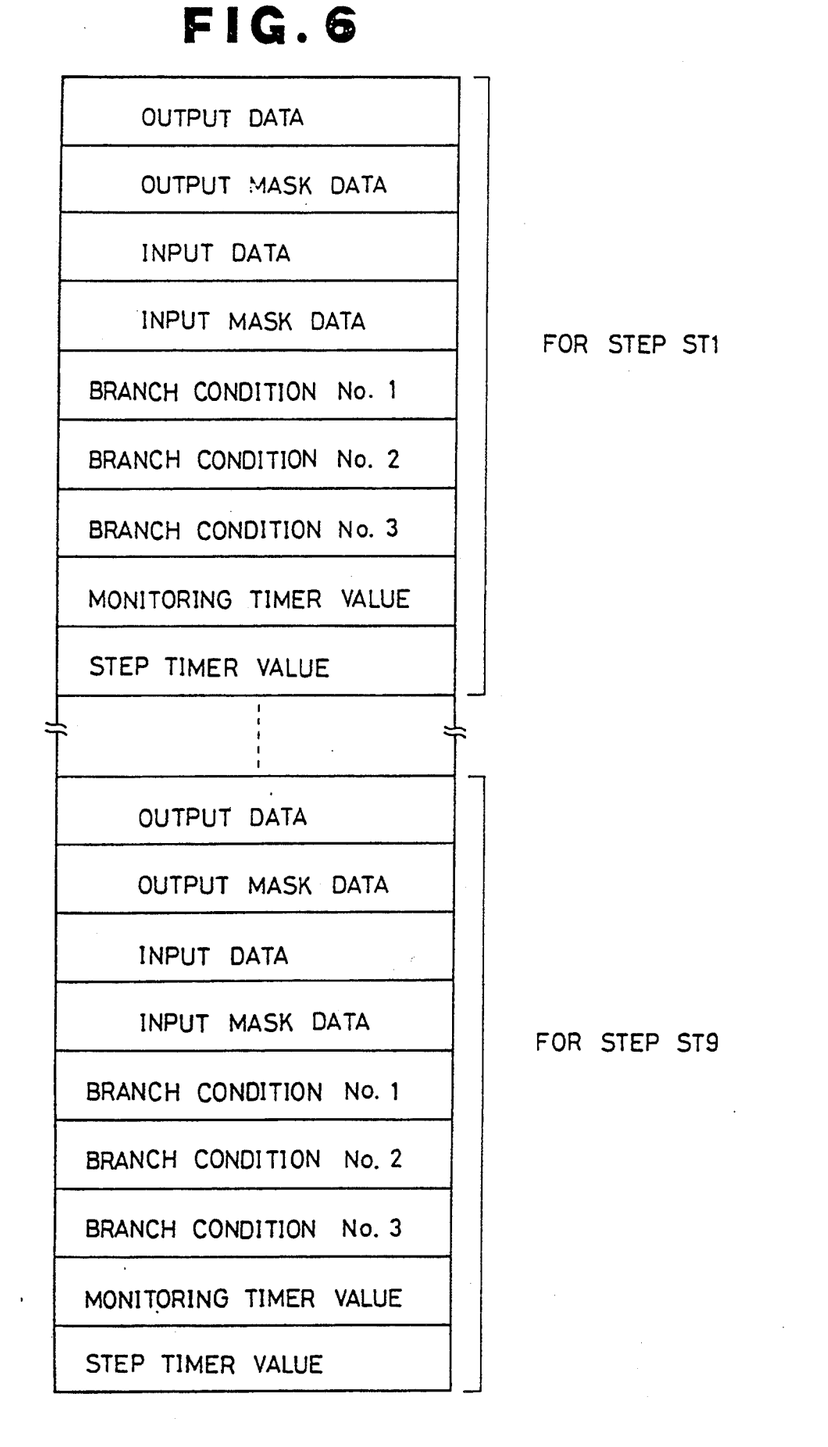
FIG. 6 is a detailed data table generally employed by prior art sequence controllers.

FIG. 6 shows a detailed data table. Specifically, the data parts of the sequence table in FIG. 1 are stored in this table using the following codes. For example, of the data for step ST3:

output data is coded as 10H;
output mask data as 0FH (because the first 4 data items are blank);
input data as 10H;
input mask data as 0FH (because the first 4 data items are blank);
branch No. 1 as 02H (2 entered);
branch No. 2 as 00H (because this item is blank);
branch No. 3 as 00H (because this item is blank);
monitoring timer value as 10H (provisional); and
step timer value as 10H (provisional).

As another example, of the data for step ST2:

output data is coded as 01H (because the first output alone is set to "1");
output mask data as 00H (because there is no blank);
input data as 06H;
input mask data as 18H;
branch No. 1 as 04 H;
branch No. 2 as 00H;
branch No. 3 as 03H;
monitoring timer value as 64H (100 seconds); and step timer value as 10H.

Figure 7:
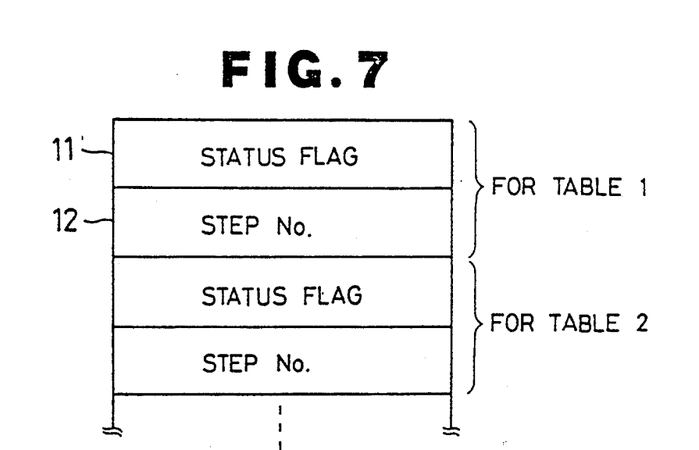
FIG. 7 is a variable data table for use by prior art sequence controllers.

FIG. 7 shows a variable data table that stores variable information for the sequence table. Illustratively, the step number indicates the current step number. If the sequence is in step ST1, then the number is 01H.

Figure 8:
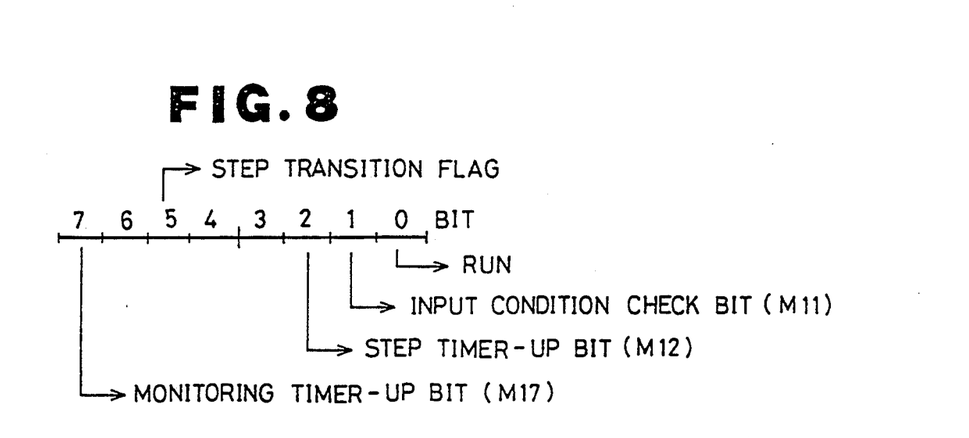
FIG. 8 is a detailed flag status view that applies to prior art sequence controllers.

The status flags store the status of the table. FIG. 8 shows the construction of the flags in detail. The run flag controls the execution and stopping of the table. In this example, the flag stays at "1", indicating the execution status.

The input condition check flag is set to a logical "1" if the input value matches its counterpart in the address table, and to a logical "0" if there is a mismatch. For example, when the sequence is in step ST2 of FIG. 1, a logical "1" is set provided that I10=0, I20=1 and I30=1; otherwise a logical "0" is set. Inputs I8 and I9 are blank and thus are not included in the check conditions.

The step timer-up flag is reset by the output process performed at the beginning of a step. When reset, the flag causes the step timer to start with the step timer value of the current step in FIG. 8. When time is up on the step timer, a logical "1" is set.

The monitoring timer-up flag acts in the same manner as the step timer-up flag.

The step transition flag is used to determine if an output process is to be carried out.

The flowchart in FIG. 4 will now be described. When the table execution instruction "EXE-TBL-1" is started, a check is made in step ST10 to see if the run bit, one of the status bits in FIG. 8, is set to "1". If "1" is found to have been set, the next step is reached. In step ST11, a check is made to see if the step transition flag is set to "1". If the flag is "1", then an output process is carried out in step ST12.

The output process mentioned above involves sending designated data to certain addresses for the output address table in the fixed data table. (In step ST2, a "1" is output to 04, a "0" to 05, a "0" to 06 and a "0" to 07. No operation is performed in a blank such as step ST3.) At the same time, the input condition check bit, step timer-up bit and monitoring timer-up bit shown in FIG. 8 are reset. The step timer and the monitoring timer are started accordingly.

Then the step transition flag in FIG. 8 is reset, and the output process is terminated in step ST13. If the step transition flag is not set to "1" in step ST11, an input condition check (FIG. 8) is made in step ST14. The process of the input condition check involves consecutively reading the data of I10, I20, I30, I8 and I9 and checking to see if the data match designated values. If all data match the corresponding designated values, the input condition check bit is set to "1"; otherwise the bit is set to "0". For example, in step ST2, a logical "1" is set if I10="0" I20="1" and I30="1"; otherwise a logical "0" is set. (Since I8 and I9 are blanks, these two conditions are regarded as fulfilled.) Then in step ST15, a timer process is carried out.

The timer process involves updating the up-times for the step timer and monitoring timer which were started in the output process; when a predetermined up-time is reached, the timer-up bit of the step timer or monitoring timer is set. The timer values are designated in each step, as illustrated in FIG. 6. Then in step ST16, a check is made to see if a branch condition is met.

A branch condition being met means that, in step ST2 for example, either the normal M11 (i.e., input condition check bit) is set to "1", or the abnormal M17 (i.e., monitoring timer-up bit) is set to "1". If both conditions are met simultaneously, the one in the upstream of the flow of control, i.e., the normal M11 in this case, takes precedence. Because the timer M12 is left blank, no branch condition is considered met even if M12 is set to "1".

If the result of the branch condition check is positive (YES), a step updating process is carried out in step ST17. This process involves updating a step number shown in FIG. 7. For example, in step ST2, the step number ST2 is replaced by ST4 if the normal M11 branch condition is met. That is, the updating causes ST4 to be the new step number. Then the step transition flag is set in step ST18. This completes all the processes involved.

There will now be explained how to deal with an abnormal state. Here, step ST2 is assumed to be in effect. If no input condition remains fulfilled because the valves 4, 5 and 6 as well as the level switches 10, 20 and 30 are faulty, the monitoring timer-up bit of the abnormal M17 for branch condition No. 3 is set, and step ST3 is reached. In step ST3, the output 015 is set to "1" and the warning lamp goes on. In response, the operator in charge checks the status of the plant and takes appropriate action. If transition is deemed possible, the operator presses the push-button switch 9 to reset the emergency stop. The normal M11 is then set to "1", and step ST2 is reached again. The warning lamp is turned off. If no other problem exists, the normal status is restored.

Likewise in steps ST4 and ST7, when time is up on the monitoring timer, the branch condition of M17 (abnormal) is met. The corresponding status flag is set to "1". Thus the same operations as above are repeated. As indicated, steps ST3, ST5 and ST8 are expended to deal with the abnormal state.

The foregoing description has shown how prior art sequence controllers are generally configured and how they work. It is evident from the description that the address parts of their sequence table are incapable of directly accommodating logical or arithmetic expressions therein. In addition, it has been necessary for the prior art sequence controllers to have additional steps to deal with abnormal states besides those provided in the sequence table. In the sequence table of FIG. 1, three steps, ST3, ST5 and ST8, are provided to address abnormal states. In actual plants, however, a large number of steps in the sequence table must be supplemented by the correspondingly large number of steps to deal with abnormal contingencies. This has resulted in the need to provide a large memory capacity.

SUMMARY OF THE INVENTION

In view of the foregoing, it is therefore an object of the present invention to provide a sequence controller capable of directly accommodating logical and arithmetic expressions in the address parts of its sequence table.

It is another object of the present invention to provide a sequence controller whose memory capacity is small thanks to a small number of steps needed to deal with abnormal states.

To attain the above-described objects, a sequence controller according to the invention has a sequence table built with a group of input condition collecting instructions, a group of branch condition collecting instructions, a table instruction and a group of output instructions, and comprises a means for organically and selectively combining these instructions in response to the respective sequence operation conditions that take place.

A sequence table according to the invention, capable of having the input condition collecting instructions, branch condition collecting instructions, table instruction and output instructions set up as desired, thus allows logical and arithmetic expressions to be executed therein.

Furthermore, to attain the above-described objects, a sequence controller according to the invention comprises a step number storing section and a step return means. The step number storing section stores the original step number when transition occurs from one step to the next in the sequence table. If a required branch condition is met in a transitional state, the step return means effects transition to the original step whose number was stored in the step number storing section, or to the step next thereto.

In addition, a sequence table according to the invention makes it possible to commonly use steps to deal with abnormal states, i.e., the steps constituting another component of the table, among different processes. This arrangement drastically reduces the number of the error-handling steps, thereby reducing the memory size required.

The above and other related objects and features of the invention, as well as the novelty thereof, will clearly appear from the following description and from the accompanying drawings. It is to be understood that these drawings are intended to illustrate the invention and are not to be construed to limit the scope thereof.

DETAILED DESCRIPTION OF THE PREFERRED EMBODIMENTS

There will now be described a first embodiment of the present invention by referring to the accompanying drawings. The sequence table of FIG. 9 comprises three tables: the instruction table of FIG. 10, the detailed data table of FIG. 9, and the variable data table of FIG. 7. In FIG. 5, the sequence controller 1 comprises a bit accumulator (BAC) for bit calculation, a word accumulator (WAC), a table number accumulator (TAC) for holding the number of the table in execution, a pointer accumulator (PAC), an input data area, and a branch condition area. These elements illustratively embody the combining means of the sequence controller mentioned above.

Figure 10:
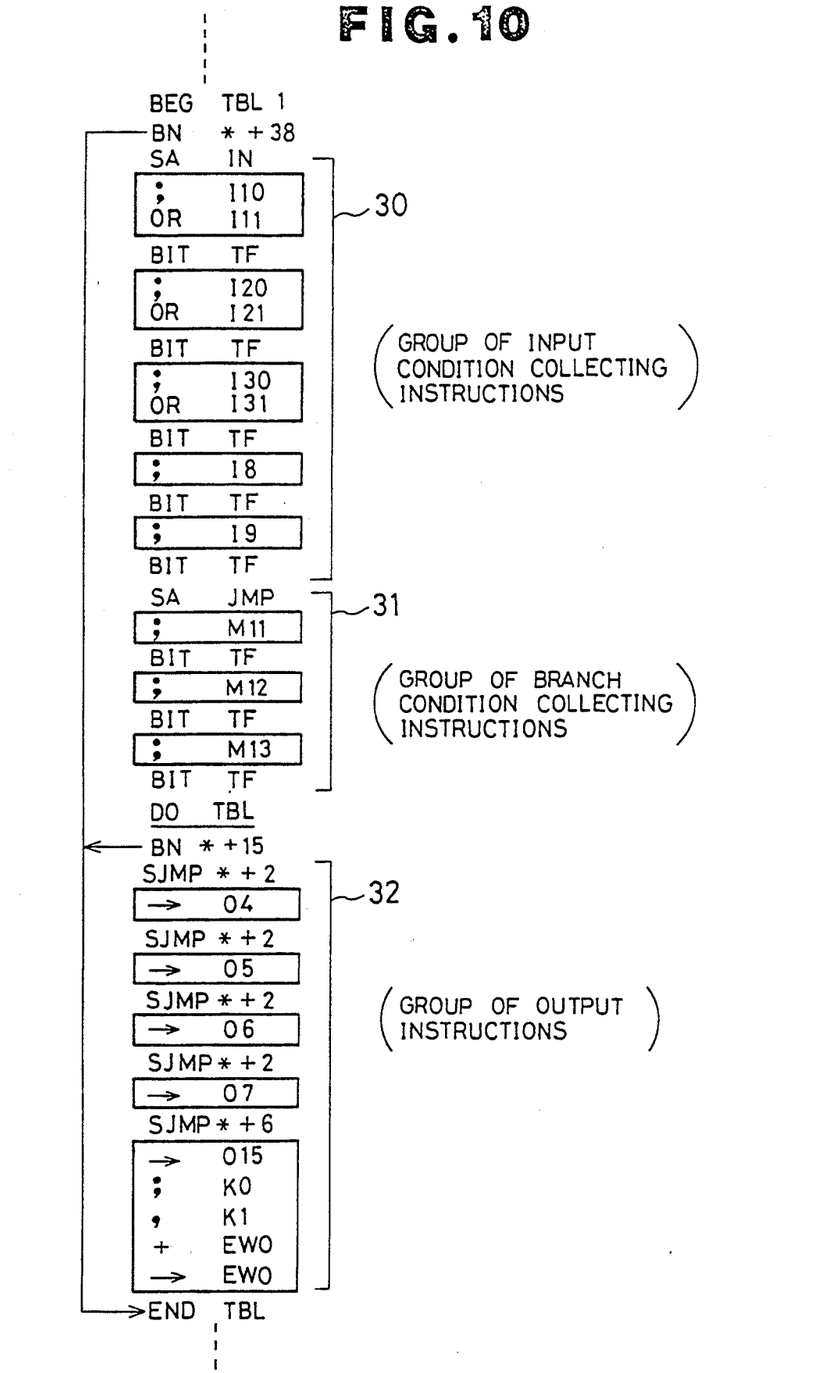
FIG. 10 is an instruction table for use by the sequence controller whose sequence table is shown in FIG. 9.

How the instruction table of FIG. 10 works is now described.

(1) Operation by the BEG TABLE 1 instruction

The number of the table about to be executed is a logical "1" contained in this BEG TBL 1 instruction. The logical "1" is written into the table number accumulator TAC Of the status flags for the table "1", the run bit is read out. The value is written to the bit accumulator BAC.

(2) Operation by the BN *+38 instruction

The BN *+38 instruction causes the following when executed: If the value of the bit accumulator BAC is "1", the next instruction is reached; if the value is "0", then the END TBL instruction, the 38th instruction from the current one, is reached. Where this instruction is combined with the BEG TBL 1 instruction, and if the run bit is "0" then a branch occurs, i.e., the table "1" is not executed. Here, for the sake of description, the run bit is considered to be "1", with the table "1" executed.

(3) Operation by the SA IN instruction

The SA IN instruction transfers the first address of the input data area to the pointer accumulator PAC.

(4) Operation by the; I10 instruction

The ; I10 instruction reads I10 (on/off information about the level switch 10 shown in FIG. 5), and writes the values to the bit accumulator BAC.

(5) Operation by the OR I11 instruction

The OR I11 instruction reads I11, described later, OR's the read value with that of the bit accumulator BAC, and writes the result to the bit accumulator BAC.

(6) Operation by the BIT TF instruction

The BIT TF instruction transfers the value of the bit accumulator BAC using the contents of the pointer accumulator as address information, and then increments the contents of the pointer accumulator PAC by 1.

Between the; I30 instruction and the ; I9 BIT TF instruction, the same operations as described above take place.

Between the SA IN instruction and the ; I9 BIT TF instruction, the input check condition data, i.e., values ranging from the result of I10 being OR'ed with I11 up to the value of I9, are consecutively transferred. These instructions (the group of input condition collecting instructions 30) form a means for gathering a plurality of input conditions and transferring the gathered input conditions as input data into the sequence table.

(7) Operations by the SA JMP instruction through the ;M13 BIT TF instruction

The SA JMP instruction transfers the first address of the branch condition area to the pointer accumulator PAC. Afterwards, as with the input check data, the values of the branch conditions M11, M12 and M17 are transferred consecutively to the branch condition area. These instructions (the group of branch condition collecting instructions 31) form a means for gathering a plurality of branch conditions and transferring the gathered branch conditions as branch data into the sequence table.

(8) Operation by the DO TBL instruction

Figure 11:
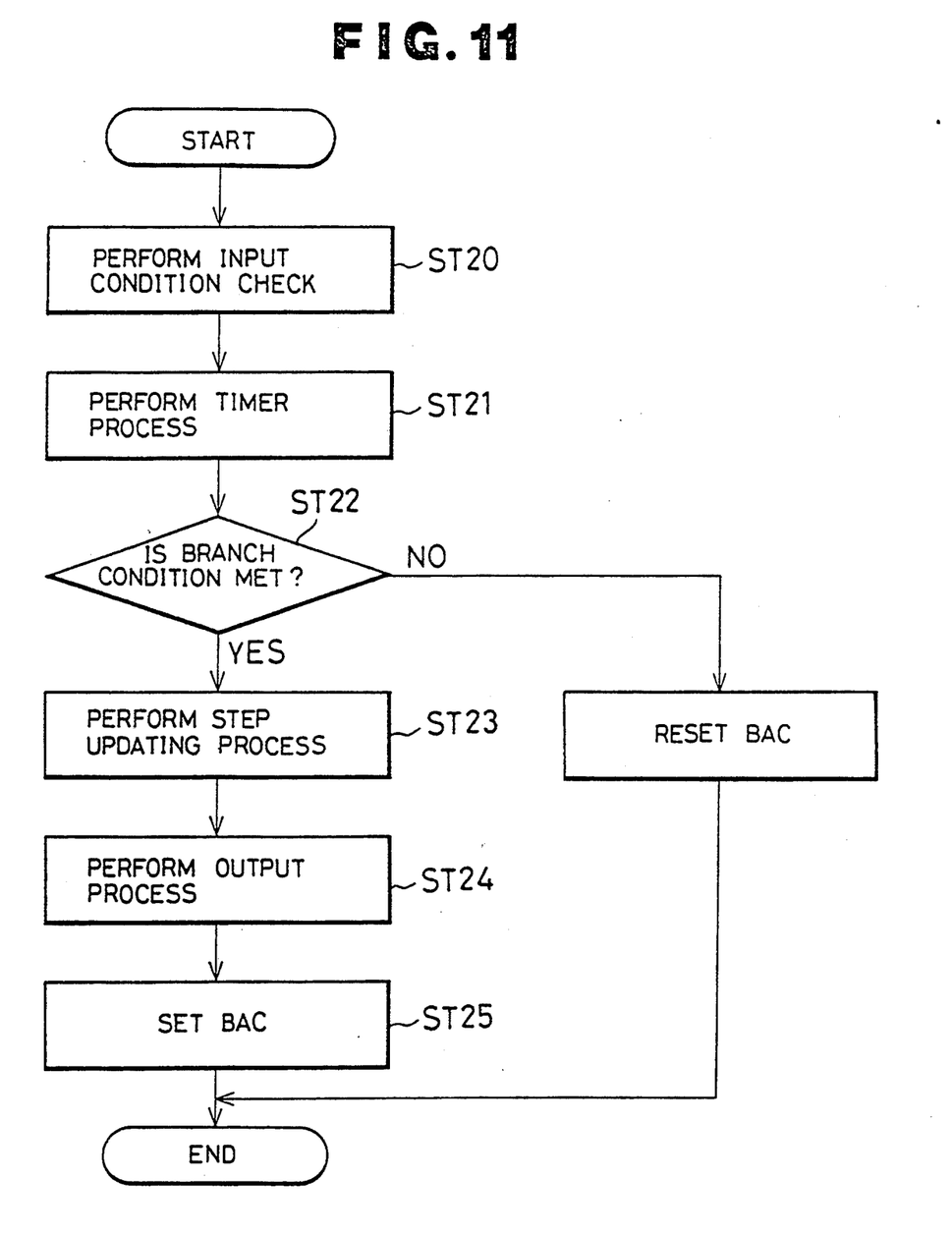
FIG. 11 is a flowchart showing how output instructions work in the first embodiment of the invention.

FIG. 11 outlines the flow of what the DO TBL instruction does. The DO TBL instruction forms a means for examining conditions gathered in the sequence table, the examining means including means for examining the input data and determining if values of the input data match corresponding predetermining values (step ST20) and means for examining the branch data and determining if a branch condition is met (step ST22). In step ST20, an input condition check is made to see if the input data (i.e., values of the input data area) match the corresponding predetermined values. If all the predetermined values are matched, the input condition check bit is set to "1"; otherwise the bit is set to "0". The difference from the prior art process is that the data are read in a pre-process by the input condition collecting instruction group 30.

In step ST21, a timer process takes place. The up-time of the step timer and that of the monitoring timer, both having been started in the output process, are updated. When a predetermined up-time is reached, the corresponding timer-up bit for the step timer or monitoring timer is set. The timer values are designated in each step, as shown in the detailed data table of FIG. 6. This step is the same as the corresponding prior art step.

In step ST22, a check is made on the previously retrieved contents of the branch condition area to see if the branch condition is met.

In step ST23, a step updating process takes place. That is, the step number shown in FIG. 7 is replaced by a new step number. This step is the same as the corresponding prior art step.

In step ST24, an output process takes place. Of the status flags, the input condition check bit, step timer-up bit and monitoring timer-up bit are reset. The step timer and monitoring timer are started when the timer values specified in the step are reached. For actual output execution, the pointer accumulator PAC is set. For example, immediately before the execution of step ST2, the pointer accumulator PAC points to the first output data in the fixed data table of FIG. 6 in step ST2.

(9) Operation by the BN *+15 instruction

If no branch condition is met when the DO TBL instruction is executed, the bit accumulator BAC is set to "0". Thus no branch is effected, i.e., the group of output instructions is not executed, until the END TBL instruction is reached.

(10) Operation by the SJMP *+2 instruction

When executed, the SJMP *+2 instruction checks the output mask data pointed to by the pointer accumulator PAC. If the data is a logical "1", a jump is made to the next instruction (the next output instruction is not executed at this time). If the data is a logical "0" the output data is read and transferred to the bit accumulator BAC. Then the next instruction is executed. In the last process of this instruction, the value of the pointer accumulator PAC is counted up so that the pointer points to the next mask data and output data.

(11) Operation by the →04 instruction

The →04 instruction outputs the value of the bit accumulator BAC to 04. When executed in combination with the SJMP *+2 instruction, this instruction illustratively outputs "0" to 04 in step ST1, "1" to 04 in step ST2, and performs no process in step ST3.

The same applies to the combinations of the other →instructions with the subsequent SJMP instructions. Below is a supplementary explanation of the last output instruction.

; K0 . . . writes "0" to the word accumulator WAC.

, K1 . . . writes "1" to the word accumulator WAC if the bit accumulator BAC contains "1" and performs no operation if the bit accumulator BAC contains "0".

+EW0 . . . adds the value of EW0 to the value of the word accumulator WAC.

→EW0 . . . writes the contents of the word accumulator WAC to EW0.

Therefore, the fifth output instruction operates as I? 25 follows In step ST2, 015 has "0" and "0" is added to EW0. Thus the value remains unchanged. In step ST3, 015 is "1", and "1" is added to EW0 That is, EW0 stores the number of times the error processing takes place. The group of output instructions 32 form a means, responsive to the means for examining the branch data, for outputting data from the sequence table.

(12) Operation by the END TBL instruction

The END TBL instruction indicates the end of the instruction table and provides no operation.

There will now be described the operations of the first embodiment by referring to the sequence table of FIG. 9. It is assumed that control is currently in step ST1. Pressing the start push-button switch 8 sets "1" to the input I8. The branch condition of M11 (normal) is met with the DO TBL instruction. Thus the step updating process and the output process are carried out. In the BN *+15 instruction immediately following the DO TBL instruction, the bit accumulator BAC contains "1". Therefore, no branch is made, and the output instruction group 32 is executed (the output of ST2 in this case). Thereafter, the input condition collecting instruction group 30, the branch condition collecting instruction group 31, and the DO TBL instruction of FIG. 11 are carried out to meet the branch condition.

Figure 9:
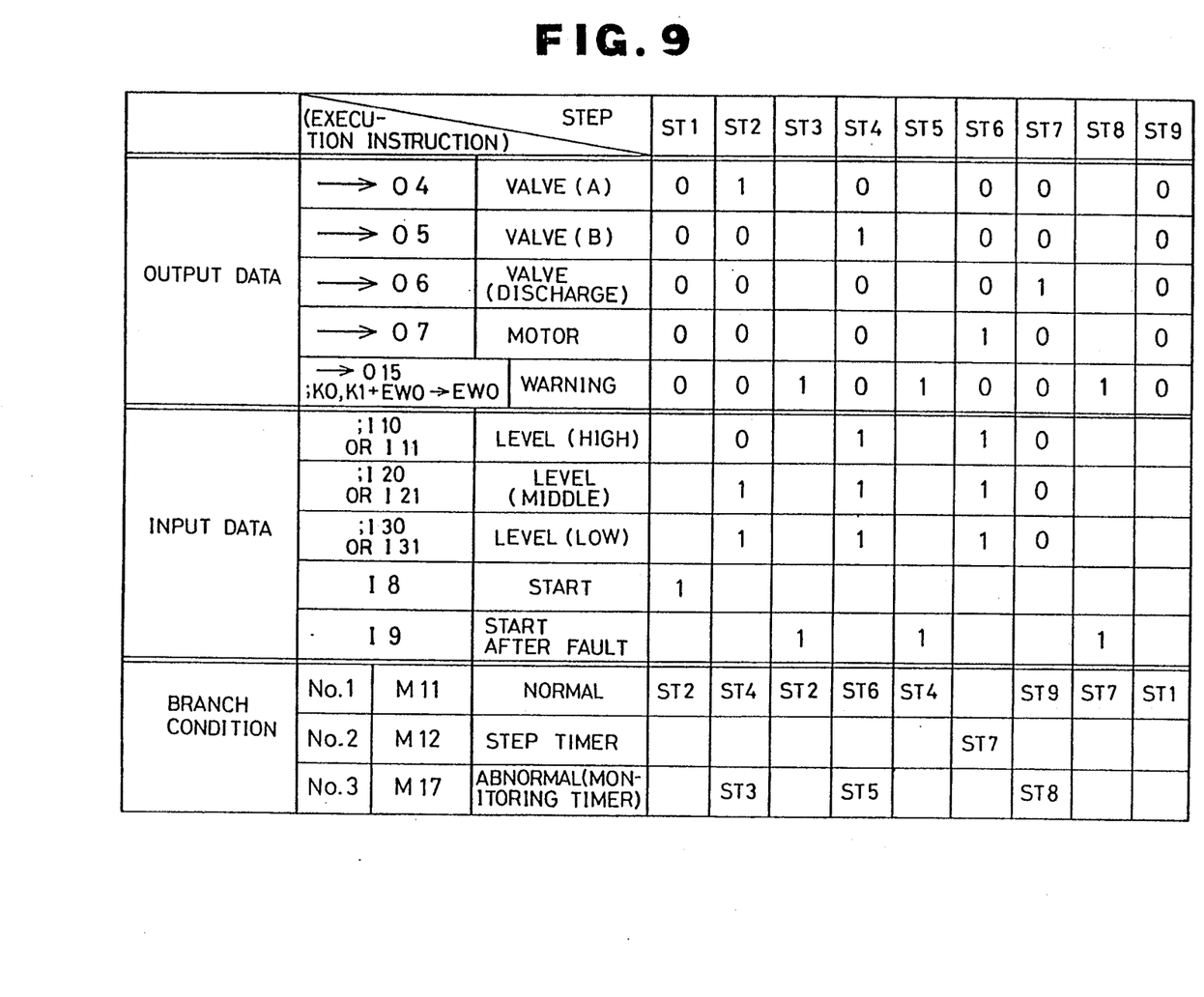
FIG. 9 is a sequence table for use by a sequence controller as a first embodiment of the present invention.

Meanwhile, in FIG. 9, I11, I21 and I31 are those inputs of the level switches which are intended to improve the level switch reliability and which are set on the same level as I10, I20 and I30. EW0 stores the number of times the error processing is carried out.

In a simplified typical plant as shown in FIG. 5, there is little need to include logical or arithmetic expression instructions. But in most actual plants, inclusion of such instructions is virtually indispensable. For example, there may be a case in which it is desired to know if the temperature is below or above the 100° C. benchmark by use of the input condition collecting instruction group 30 and the branch condition collecting instruction group 31. In that case, it is necessary to compare detected analog values with the predetermined level so that the resulting bit-based information may be handled by the instructions. In some cases, arithmetic operations or more sophisticated operations need to be performed in certain steps. Such needs are readily met by the first embodiment of the invention.

The above-described first embodiment has adopted the use of an accumulator means to combine various instructions organically and selectively. This aspect of the invention may be implemented using other methods including a stack arrangement. According to the invention, such methods also provide the same effects as the method of the first embodiment.

The same effects are also attained by dividing or combining the instructions.

Figure 12:
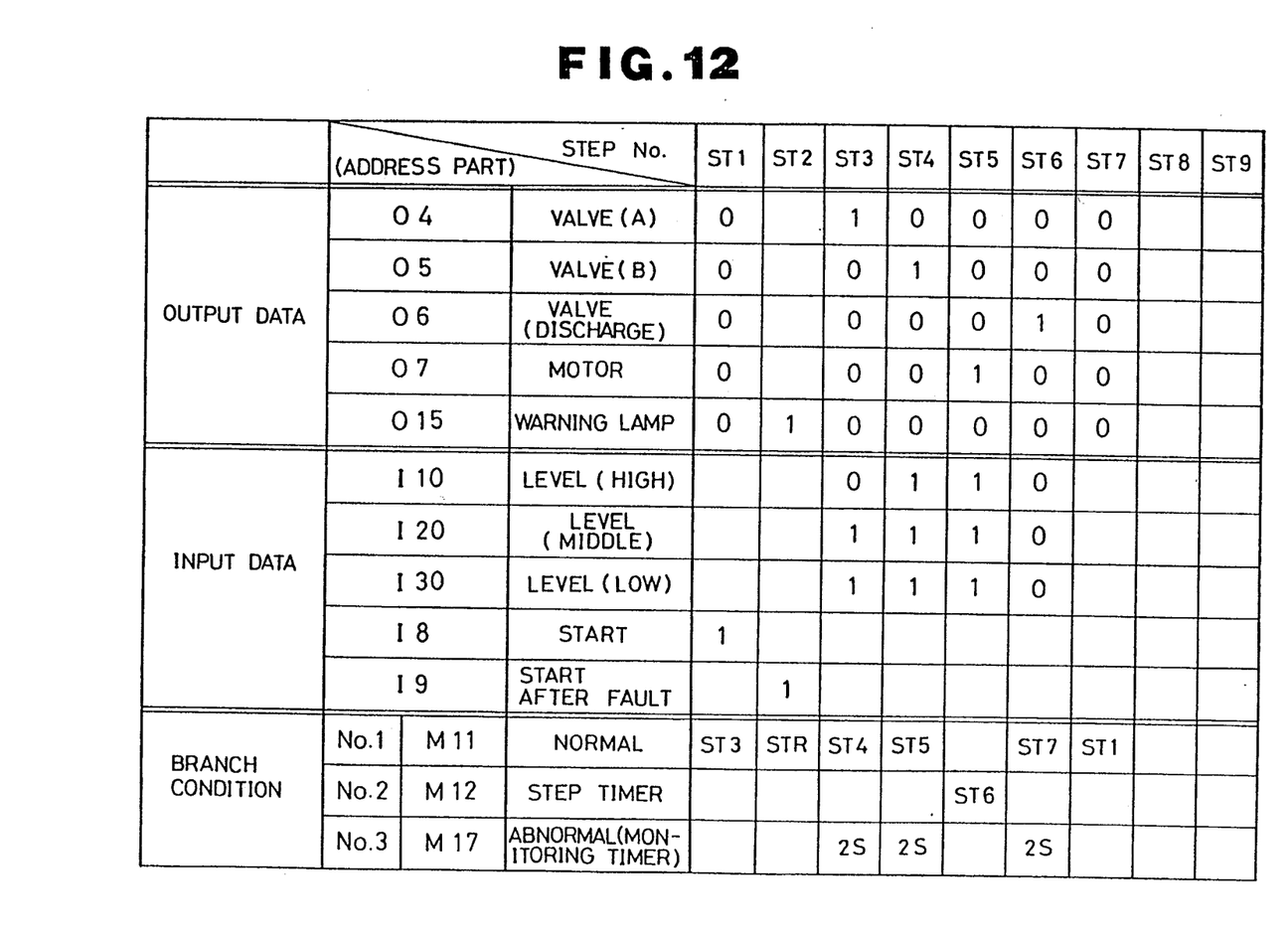
FIG. 12 is a sequence table for use by a second embodiment of the present invention.
Figure 13:
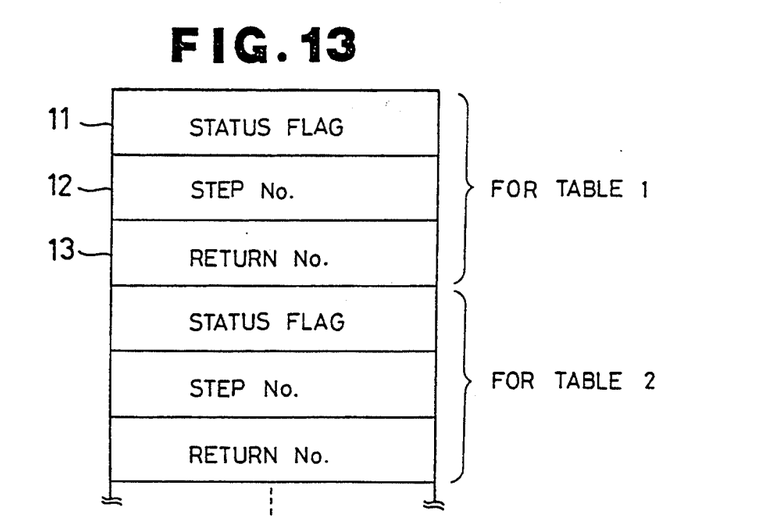
FIG. 13 is a variable data table for use by the second embodiment.

FIG. 12 shows the sequence table for use by a second embodiment of the invention. This table provides the same operations as the table shown in FIG. 1. FIG. 13 shows the variable data table for use by the second embodiment. The return numbers in FIG. 13 constitute the step number storing section. FIGS. 2, 3, 4 and 6 apply not only to prior art sequence controllers but also to the present invention, except that FIGS. 4 and 6 involve slight changes in their contents when applied to the invention.

FIG. 6 applies unchanged to the present invention except for the branch condition numbers. In the sequence table of FIG. 12, the position identified by a character R (return) in a branch condition number in step ST2 is assigned OFFH, with a blank indicated by "0" the same as in the prior art Positions 2S in a branch condition number in step ST3 are assigned 82H each, indicating that the monitoring timer-up flag is "1". (A position S indicates that the monitoring timer-up flag is "1".) A position ST4 in a branch condition number is assigned O4H, the same as in the prior art.

In FIG. 4, all the processes except for the step updating process (performed by the step return means) are the same as in the prior art. When the monitoring timer-up flag is "0" for the number of the branch condition which is found met in the fixed data table of FIG. 6, only the step number in the variable data table of FIG. 13 is updated, the same as in the prior art.

When the monitoring timer-up flag in the branch condition number is "1" and the branch condition number is other than OFFH, the value stored in step No. 12 is saved in return No. 13, and then step No. 12 is updated. When the branch condition number is OFFH, the value saved in return No. 13 is placed in step No. 12.

Now the operations involved will be described. It is assumed here that an abnormal state has occurred in FIG. 12 and that control is currently in step ST3. When the monitoring timer is turned on (abnormal M17 set to "1") before an input condition is met (normal M11 set to "1") due to a valve or level switch failure, step ST2 is reached. Because the monitoring timer-up flag is set to "1" in the branch condition number placed in the fixed data table (designated by character S), ST3 is stored into return No. 13 in the variable data table of FIG. 13. In step ST2, the warning lamp 15 is turned on, while the other output data remain unchanged. In response to the error, the operator checks the plant status and, if action is deemed possible, presses the emergency stop reset push-button switch 9. This sets the input I9 to "1". The normal M11 is then set to a logical "1" as well, with a branch (designated by character R) carried out. This branch constitutes transition to the step whose number was stored in return No. 13 of the variable data table. That is, step ST3 is again reached. At this time, the warning lamp 15 is turned off.

If an abnormal state occurs in step ST4 or ST6, it can be seen that control is temporarily passed to step ST2 and is then returned to the original state in the same manner as described above.

The first embodiment has been described above from the viewpoint of making the error processing common to multiple steps. It is also evident that normal processing can also be shared among a plurality of steps in the same manner.

In the above-described embodiment, only one return step number is stored. Alternatively, a plurality of step numbers may be stacked on a last-in, first-out basis (LIFO) in a nesting arrangement.

Figure 14:
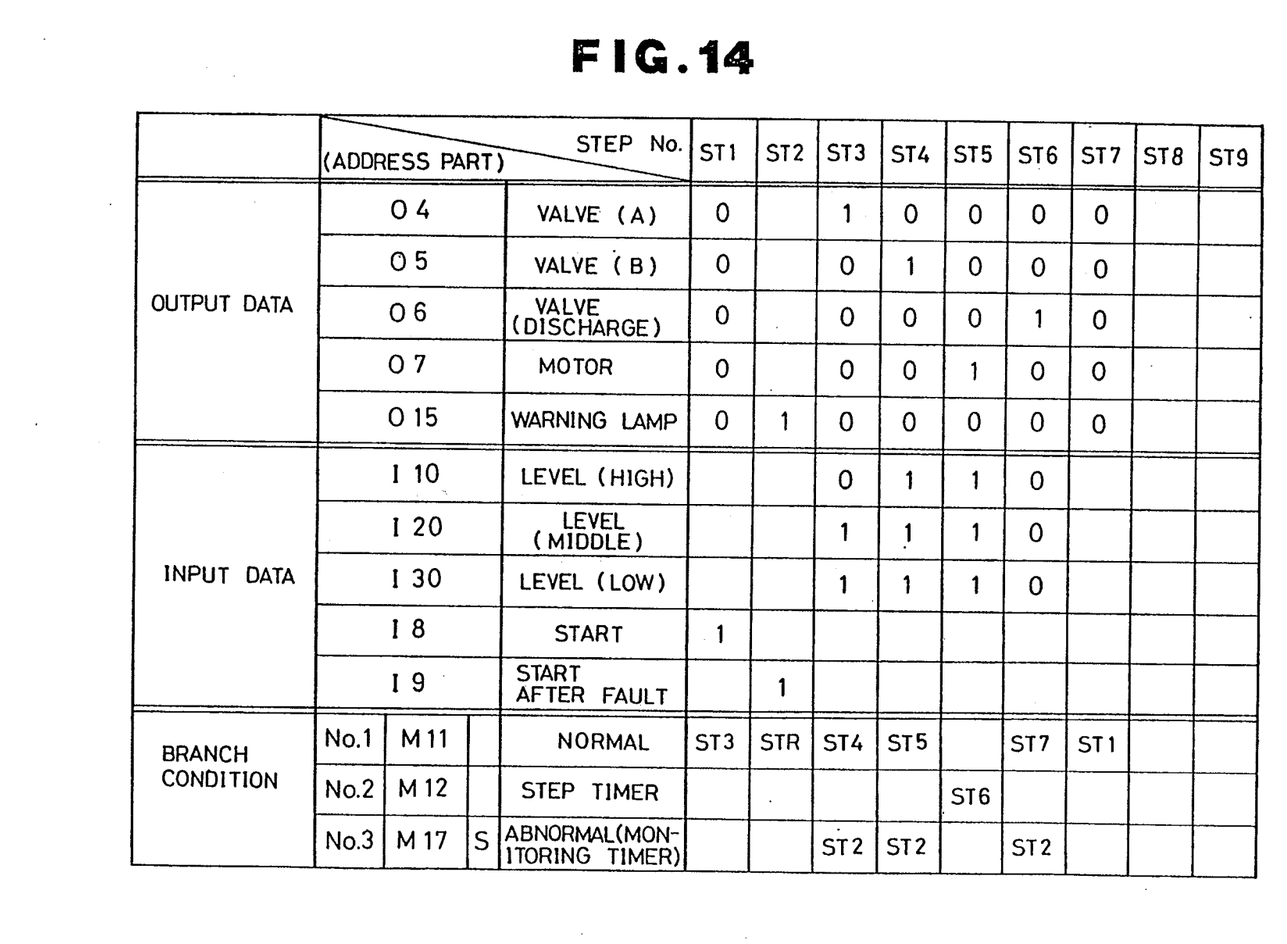
FIGS. 14 and 15 are sequence tables for use in variations of the second embodiment.

In the same embodiment, the monitoring timer-up flag is used to determine whether or not to store the return step number in return No. 13. Alternatively, as shown in the sequence table of FIG. 14, arrangements can be provided so that a branch with M17 (abnormal) may cause all return step numbers to be stored in return No. 13.

Also in the embodiment, control is returned to the step whose number was stored in return No. 13. Alternatively, the same effects are attained by reaching the step next to that designated by the stored step number. For example, upon branch from step ST4 to step ST2, ST4 is stored. But upon return from step ST2, not step ST4 but step ST5, a normal branch destination specified in step ST4, may be reached instead.

Figure 15:
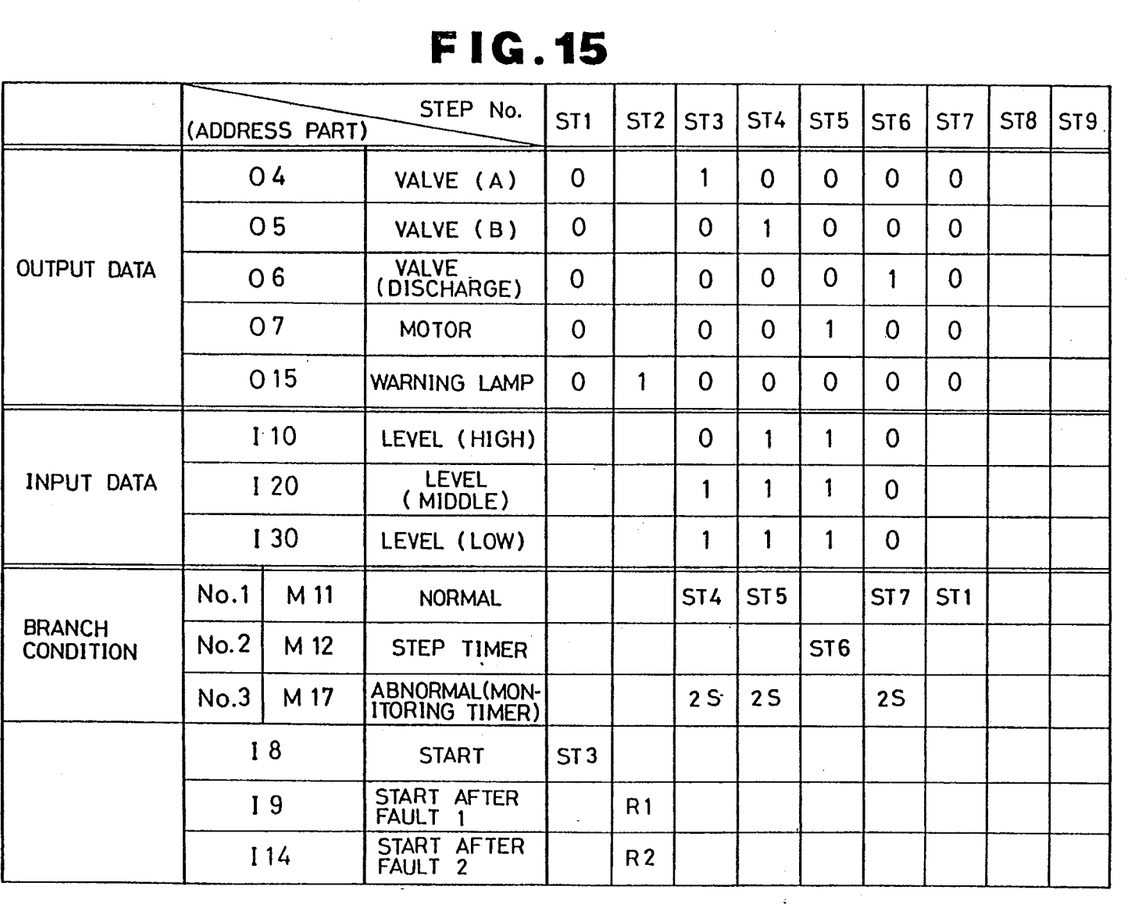

As shown in the sequence table of FIG. 15, transition to step ST4 or ST5, among others, may be distinguished as return 1 or return 2, both actions being identified by characters R1 and R2.

Referring now to FIG. 15, how the table operates will be described with a particular focus on step ST2. When the input I9 is set to "1", a return R1 occurs. This action is the same as its counterpart in FIG. 12. When the input I14 is set to "1", a return R2 takes place. This causes a check to be made on the step number stored in the return number part of the variable data table in FIG. 13. When the step whose branch condition was met has been found, a branch is made thereto. For example, there may be a case where an abnormal state having occurred after step ST4 is dealt with in step ST2, followed by the return R2 made by the input I14. In that case, control is not returned to step ST4 but is passed on to step ST5 designated in the branch condition number of step ST4. That is, control is returned to the step next to the one previously executed.

As described above, the first embodiment of the present invention constitutes a sequence controller that comprises an input condition collecting instruction group, a branch condition collecting instruction group, an output instruction group and other instructions to include logical and arithmetic expressions in its sequence table. Thus the sequence controller can handle complicated control operations by use its the sequence table.

The second embodiment of the invention constitutes a sequence controller which comprises a sequence table having a step number storing section and a step return means. When an abnormal state has occurred, the step number storing section stores the number of the step in effect at the time. If a predetermined branch condition is met, the step return means effects transition to the stored step or to the one next thereto. This setup allows error-handling steps to be shared among different processes. That in turn reduces the total number of steps involved in the sequence table and lowers the memory size for the fixed data table accordingly.

What is claimed is:

1. A sequence controller which monitors input data during execution of a step, said sequence controller comprising:
    means for gathering a plurality of input conditions and transferring the gathered input conditions as input data into a sequence table;
    means for gathering a plurality of branch conditions and transferring the gathered branch conditions as branch data into the sequence table;
    means for examining conditions gathered in the sequence table, said examining means comprising means for examining the input data and determining if values of the input data match corresponding predetermined values, and means for examining the branch data and determining if a branch condition is met;
    means, responsive to said means for examining the branch data, for outputting output data from said sequence table; and
    means for logically and arithmetically combining the input data and the branch data, as required, when said input data and branch data are executed.

2. A sequence controller according to claim 1, wherein said combining means comprises a plurality of means for storing data on a last-in, first-out (LIFO) basis.

3. A sequence controller according to claim 1, wherein said combining means comprises a plurality of accumulator means.

4. A sequence controller which monitors input data during execution of a currently executing step, said sequence controller comprising:
    means for gathering a plurality of input conditions and transferring the gathered input conditions as input data into a sequence table;
    means for gathering a plurality of branch conditions and transferring the gathered branch conditions as branch data into the sequence table;

means for examining conditions gathered in the sequence table said examining means comprising means for examining the input data and determining if values of the input data match corresponding predetermined values, and means for examining the branch data and determining if a branch condition is met;

means for storing at least one stp number corresponding to the currently executing step when said input data satisfy one of the branch conditions;

means, responsive to said means for examining the branch data, for outputting output data from said sequence table;

means for logically and arithmetically combining the input data and the branch data, as required, when said input data and branch data are executed; and step return means included in said sequence table, which, when said input data satisfy said branch condition while a step number is being stored in said step number storing section, causes a return a predetermined step based on said stored step number.

5. A sequence controller according to claim 4, wherein said step return means is adapted to cause transition to the step corresponding to the stored step number.

6. A sequence controller according to claim 4, wherein said step return means is adapted to cause transition to the step whose number is next to the stored step number.

7. A sequence controller according to claim 4, wherein said step number storing section comprises a last-in, first out (LIFO) storing stack capable of nesting a plurality of step numbers.

8. A sequence controller which monitors input data during execution of a step, said step being designated by a number n indicative of the order of execution of said currently executing step in an ordered sequence of steps, said sequence controller comprising:

means for gathering a plurality of input conditions and transferring the gathered input conditions as input data into a sequence table;

means for gathering a plurality of branch conditions and transferring the gathered branch conditions as branch data into the sequence table;

means for examining conditions gathered in the sequence table comprising means for examining the input data and determining if values of the input data match corresponding predetermined values, and means for examining the branch data and determining if a branch condition is met;

means for storing the said number n when said input data satisfy one of the branch conditions;

means, responsive to said means for examining the branch data, for outputting output data from said sequence table; and means for logically and arithmetically combining the input data and the branch data, as required, when said input data and branch data are executed.

9. A sequence controller according to claim 7, further comprising step return means included in said sequence table, which, when said input data satisfy said branch condition while said number n is being stored in said step number storing section, causes a return to the step designated by said number n.

10. A sequence controller according to claim 7, further comprising step return means included in said sequence table, which, when said input data satisfy said branch condition while said number n is being stored in said step number storing section, causes a return to the step designated by a number m which is numerically adjacent said number n in said ordered sequence of steps.

11. A sequence controller according to claim 1, wherein the means for gathering a plurality of input conditions and transferring the gathered input conditions reads in the plurality of input conditions and transfers the gathered input conditions in a pre-process.

* * * * *